United States Patent
Lotvonen et al.

(10) Patent No.: US 8,351,900 B2
(45) Date of Patent: Jan. 8, 2013

(54) MAN-IN-THE-MIDDLE DETECTOR AND A METHOD USING IT

(75) Inventors: Jukka Lotvonen, Kempele (FI); Juha Kumpula, Oulu (FI); Markus Ahokangas, Ylivieska (FI); Janne Pauna, Tupos (FI)

(73) Assignee: EXFO Oy, Oulu (FI)

( * ) Notice: Subject to any disclaimer, the term of this patent is extended or adjusted under 35 U.S.C. 154(b) by 731 days.

(21) Appl. No.: 12/124,607

(22) Filed: May 21, 2008

(65) Prior Publication Data

US 2009/0104889 A1    Apr. 23, 2009

(30) Foreign Application Priority Data

Jun. 13, 2007   (EP) .................................... 07110159

(51) Int. Cl.
*H04M 1/66*       (2006.01)
*H04W 24/00*      (2009.01)
(52) U.S. Cl. ...................... 455/410; 455/411; 455/456.4
(58) Field of Classification Search .................. 455/410, 455/411, 456.1, 456.4
See application file for complete search history.

(56) References Cited

U.S. PATENT DOCUMENTS

| | | | | |
|---|---|---|---|---|
| 6,466,777 B1 * | 10/2002 | Urita | | 455/410 |
| 7,149,531 B2 * | 12/2006 | Misikangas | | 455/456.1 |
| 7,266,364 B2 * | 9/2007 | Itoh | | 455/410 |
| 7,286,515 B2 * | 10/2007 | Olson et al. | | 370/338 |
| 7,346,338 B1 * | 3/2008 | Calhoun et al. | | 455/411 |
| 7,370,362 B2 * | 5/2008 | Olson et al. | | 726/25 |
| 7,716,740 B2 * | 5/2010 | Robert et al. | | 726/23 |
| 7,822,412 B2 * | 10/2010 | Lagnado | | 455/422.1 |
| 2002/0160815 A1 * | 10/2002 | Patel et al. | | 455/564 |
| 2003/0114114 A1 * | 6/2003 | Itoh | | 455/69 |
| 2003/0232598 A1 | 12/2003 | Aljadeff et al. | | |
| 2004/0023640 A1 | 2/2004 | Ballai | | |
| 2005/0060576 A1 | 3/2005 | Kime et al. | | |
| 2006/0197702 A1 | 9/2006 | Jones | | |

FOREIGN PATENT DOCUMENTS

EP       1763178 A       3/2007
WO    2007054834 A      5/2007

* cited by examiner

*Primary Examiner* — Duc M Nguyen
(74) *Attorney, Agent, or Firm* — Volpe and Koenig, P.C.

(57) ABSTRACT

A method receives signaling messages by a mobile apparatus at least from one base station of a cellular network, interprets a received signaling message, searches for an anomaly with at least one signaling parameter of the received signaling message from a first base station to a known comparison signaling parameter, gives an alert if the comparison gives an unequal result concerning at least one signaling parameter.

19 Claims, 5 Drawing Sheets

MAN-IN-THE-MIDDLE DETECTOR AND A METHOD USING IT

FIELD OF THE INVENTION

The invention relates to a method detecting intrusion attacks from a rogue attacker. The invention relates also to a man-in-the-middle detector apparatus and software which is utilized in the method.

BACKGROUND OF THE INVENTION

Rogue base stations (BS) can be used in wireless networks to catch identities of mobile terminals, to locate mobile terminals and to eavesdrop communication of the mobile terminals. In GSM networks (Global System for Mobile communication) performing man-in-the middle attacks is possible because the base stations of the GSM network do not authenticate themselves toward mobile terminals which they are serving. This phenomenon provides for a possibility to a rogue base station to take over one or more mobile terminals. When a mobile terminal has accepted a rogue BS as its serving base station, the rogue base station can for example command the cheated mobile terminal to deactivate its GSM encryption. When the mobile terminal makes a call, the rogue base station can reroute the call to a base station of the authentic network and convey the voice/data of the mobile terminal to the authentic mobile network. Therefore the mobile terminal does not discover that the rogue base station is cheating it.

Publication US 2006/0197702 suggests one solution to the problem of a man-in-the-middle in a case where a mobile terminal is stationary. According to the publication, in that case there does not exist a need to make handovers. However, if the rogue base station causes a handover, the mobile terminal can detect that receiving power increases and/or the direction of the transmission changes. These changes are used as a sign of a man-in-the-middle attack. However, this solution is usable only in a stationary case.

The case of a moving mobile station is more complicated. Because the mobile terminal is moving, the receiving power and/or direction of transmission of the serving base station changes. Therefore the solution suggested in US 2006/0197702 can give wrong alerts.

Rogue base stations are using features of the network reselection procedure to get the mobile terminals to camp into the rogue base station. In GSM networks mobile terminals are periodically measuring reception quality of neighbor base stations and the serving base station. When the reception quality from a neighbor base station exceeds the quality of the serving base station, the neighbor base station is selected as a serving base station according the network reselection procedure. A rogue base station masquerades a neighbor cell, and by using high transmission power and modifying network selection parameters broadcasted in system information messages the rogue base station becomes a tempting destination for cell reselection. After that, the mobile terminals in the rogue cell area will select the rogue base station as a serving cell.

A group of the cells of the cellular network can be grouped to a location area. All cells of the same location area send in the broadcast channel one and the same location area code (LAC code). Usually a rogue base station uses a LAC code different from that in the serving cell to initiate the mobile terminals to start location update procedure. If the mobile terminals try to reselect the rogue base station, it can catch identities of mobile terminals nearby.

A mobile terminal of a cellular radio system always tries to select a certain base station and camp within its coverage area. Traditionally cell reselection is based on the measurement of strength of the received radio signal, either at the base station or at the mobile terminal. For instance, in the GSM system each base station transmits a signal on the so called beacon frequency which is different for neighboring base stations. In the GSM system a base station transmits on the so-called BCCH channel (Broadcast Control Channel) the parameters p1 and p2 to the mobile terminal, whereby these parameters are used to calculate the so-called C values. For instance, the C1 value commonly used in the cellular GSM network is calculated from the equation below:

$C1:=(A-\mathrm{Max}.(B,0))$, where

A:=average level of the received signal—p1 (dB)
B:=p2—maximum transmission power of the terminal (dB)
p1:=allowed minimum value for the received signal
p2:=allowed maximum transmission power for a terminal.

The terminals must measure the reception levels of the broadcast signals of all base stations which they can receive so that they will be able to calculate the C1 value of each received cell. The cell which has the highest calculated C1 value is the most advantageous regarding the radio connection. In order to optimize cell reselection the network can also transmit additional parameters which enable the use of so called C2 values. A more detailed description is presented for example in ETSI 05.08 version 6.4.0. A rogue base station tries to utilize this cell reselection phenomenon.

The base stations transmit to the mobile terminals information about the BCCH frequencies used by the neighboring cells, so that the terminals will know on which frequencies they must listen in order to find the BCCH transmissions of the neighboring cells.

FIG. 1 shows an example of an attack against a mobile terminal 150 which is possible in the prior art cellular systems. There are three authentic serving cells in the network 10: cell A 110, cell B 120 and cell C 130. They all can belong to the same location area and therefore they are sending the same LAC code in their broadcast channels. The mobile terminal 150 receives broadcast signals 111, 121 and 131 from these cells accordingly. In the depicted example of FIG. 1 the cell A 110 is the serving cell to the mobile terminal 150.

A rogue base station 101 tries to commandeer the mobile terminal 150. It uses high transmission power in its BCCH transmissions 102 compared to the transmission of the authentic cells' base stations. The rogue base station most probably uses a LAC code in its transmission which differs from the LAC codes of the authentic nearby base stations of the cellular network 10. The rogue base station can establish one or more connections 103 for example to the authentic base station of cell A 110. The base station of cell A 110 sees the rogue base station 101 as a normal mobile terminal or terminals. Therefore the authentic base station A 110 does not exclude the rogue base station 101 in its operation.

Therefore, there exists a need for a method and apparatus by which a man-in-the-middle can be detected in stationary or moving cases of a mobile terminal.

SUMMARY

An object of the present invention is to provide a new method and an apparatus using the method for detecting a rogue base station in a cellular network.

The objects of the invention are achieved by a method and a mobile apparatus which can detect anomalies either in transmissions which originate from the rogue base station and/or the location of the rogue base station.

Further developments of the invention are the subject-matter of the dependent claims.

An advantage of the invention is that it increases security of a mobile communication system.

Another advantage of the invention is that it can be integrated as a part of a mobile terminal.

A further advantage of the invention is that the rogue base station can be found even if the mobile terminal is moving.

The idea of the present invention is basically as follows: There is a mobile terminal that is provided with software having an access to the network measurement parameters received. The mobile terminal comprises software by which all kinds of anomalies in the signaling transmissions of the base stations nearby can be analyzed and detected. The anomalies can be for example anomalies in BCCH transmissions, like a LAC code of one base station differing substantially from the LAC code of other cells, surprisingly high transmission power, unknown cell id, different periodic location update frequency, different C1 or C2 value and anomalies in signaling messages like wrong network time, different cause code in location update termination, incorrect paging message, paging message with IMSI (International Mobile Subscriber Identity) or some combination of the previous. An anomaly can also be a geographical location of the rogue base station that is not included in a list of possible locations of the base stations belonging to the serving cellular network.

In one advantageous embodiment network parameters used in authentic network base stations are configured and saved in a memory of the measurement apparatus prior to anomaly detection. These parameters may also include positions and coverage areas of the authentic base stations. These parameters are advantageously recorded and can be visualized using a map screen or imported from a GIS system (Graphical Information System). Any anomalies can then be detected by comparing parameters received from base stations to the configured reference base station parameters.

In another advantageous embodiment network parameters of base stations are stored to a database with position information beforehand. Recorded network parameters can be used later on to do anomaly detection without a need to scan through all base stations. Recorded network parameters can be also used to detect new cells using normal network parameters or usage of higher power level than before.

The found anomalies can advantageously be utilized in giving an alert to the user of the mobile terminal. The user can optionally either camp in or stay out from the rogue base station. In both cases the mobile terminal according to the invention can take a bearing for locating the rogue base station.

BRIEF DESCRIPTION OF THE DRAWINGS

Further scope of applicability of the present invention will become apparent from the detailed description given hereafter. However, it should be understood that the detailed description and specific examples, while indicating advantageous embodiments of the invention, are given by way of illustration only, since various changes and modifications within the spirit and scope of the invention will become apparent to those skilled in the art from this detailed description. Reference is made to the accompanying drawings in which.

DETAILED DESCRIPTION

Figure 1A:
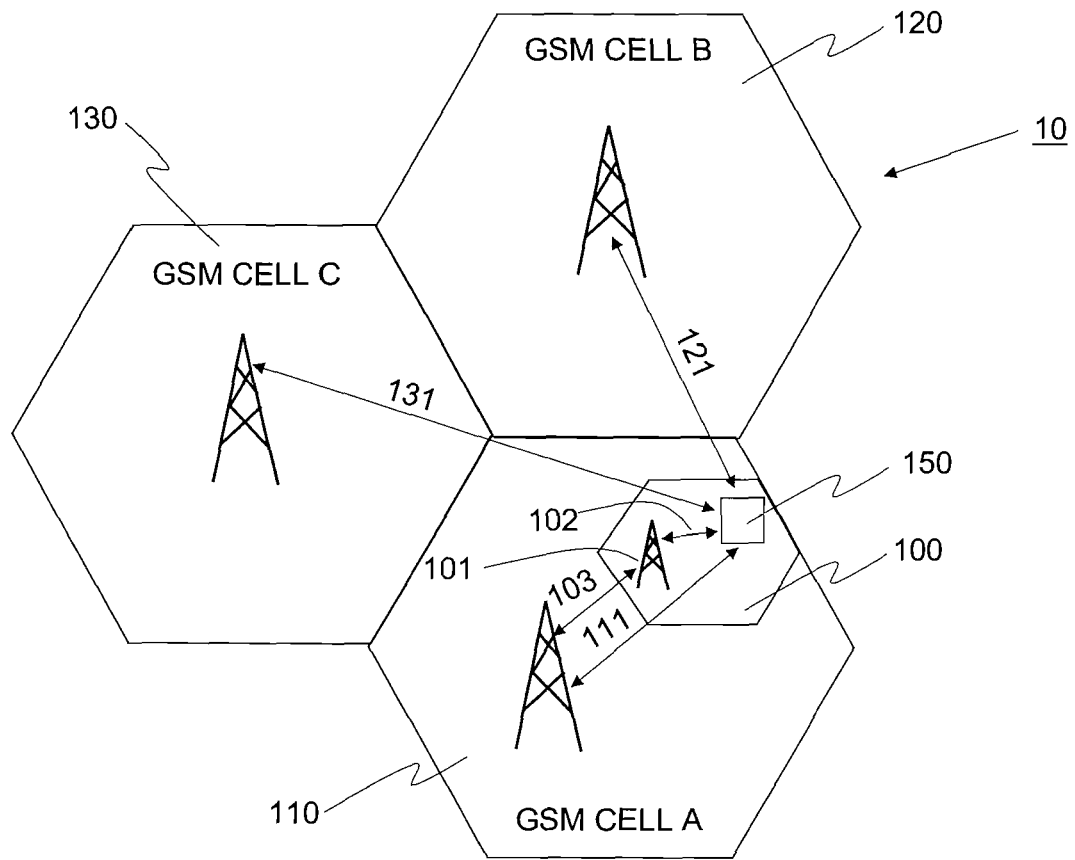
FIG. 1 shows an example of a telecommunication network of a prior art where a rogue base station is transmitting.

FIG. 1 was discussed in conjunction with the description of the prior art.

Figure 2A:
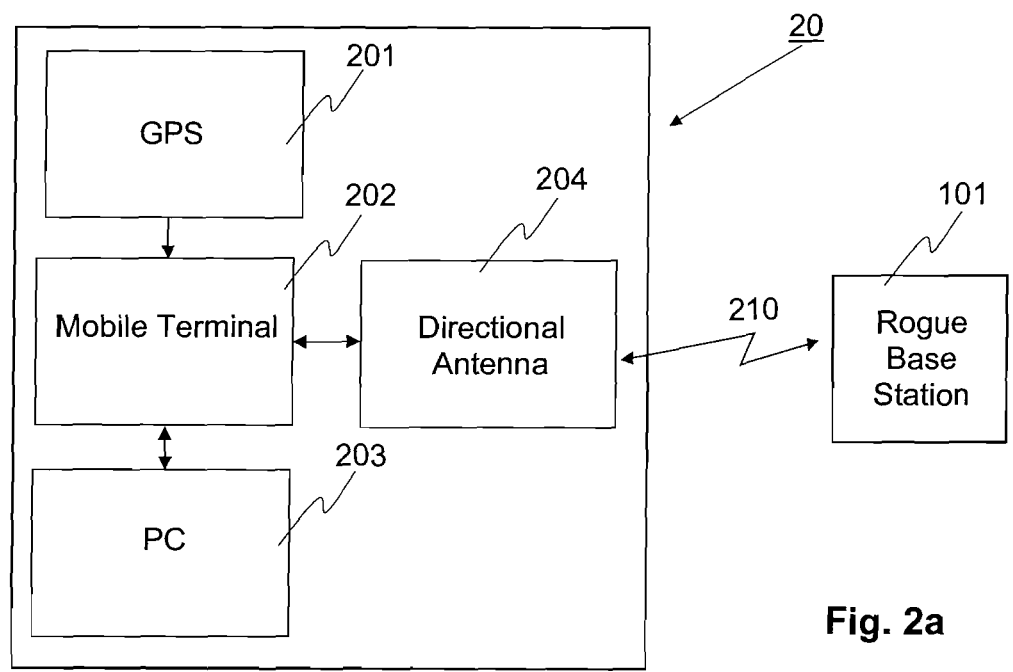
FIG. 2a shows as an example an embodiment of the man-in-the-middle measurement apparatus according to the invention.

FIG. 2a illustrates an example of a measurement apparatus 20 according to the invention. The measurement apparatus 20 can be utilized in a measurement system which can be utilized to find out a rogue base station 101. The measurement apparatus 20 comprises advantageously a processing unit which can be for example a PC 203. The measurement apparatus 20 further comprises a mobile terminal 202 and optionally also a GPS locating device 201. The GPS locating device 201 can be utilized in location measurements of the measurement apparatus. The measurement apparatus can also comprise a directional antenna system 204 which can be utilized when taking a bearing of the rogue base station 101.

The mobile terminal 202 included in the measurement apparatus 20 advantageously comprises a processor unit, a memory, a transmitter and a receiver whereby it is capable for transmitting and receiving messages in a serving cell. The mobile terminal 202 can receive signaling transmissions of serving and neighbor cells. The received transmission can be for example a BCCH transmission, paging message with IMSI (International Mobile Subscriber Identity) or location update reject message. The direction to the rogue base station can be found out without camping in the rogue base station by using available neighbor cell measurements.

In one advantageous embodiment measurement software according to the invention is running in the PC 203 of the measurement apparatus 20. The software searches anomalies from the received transmissions of the serving and neighbor cells. The searched anomalies can comprise for example anomalies in BCCH transmissions like a LAC code of one cell which differs substantially from the LAC code of other cells, high transmission power, unknown cell id, different periodic location update frequency, different C1 or C2 value and anomalies in communication sequences like wrong network time, different cause code in location update termination, incorrect paging message, paging message with IMSI or some combination of the previous.

The PC 203 comprises advantageously also a display and a speaker for giving an alert when a rogue base station 101 has been detected. The alert can be given for example by playing an alert sound, vibrating, flashing lights or displaying alert on a screen of the measurement apparatus 20.

The directional antenna 204 can advantageously be connected to the mobile station 202 of the measurement apparatus 20. When a rogue base station 101 is detected, a bearing of the transmission 210 can be taken by turning the directional antenna 204. The rogue base station 101 is in a direction wherefrom the mobile station 202 of the measurement apparatus 20 receives maximum reception level. When the bearing of the rogue base station 101 has been taken, an estimate of its distance from the measurement apparatus 20 can be calculated by using the timing advance that the rogue base station 101 uses in its transmission. If the PC 203 is in a position to retrieve an electronic map application it can show an estimated place of the rogue base station 101 on the map.

In another advantageous embodiment the measurement software according to the invention is running in a conventional mobile terminal of a cellular network. The mobile terminal can also optionally comprise a GPS unit for location finding. An auxiliary directional antenna system can be connected to the mobile terminal for taking a bearing to a rogue base station. When the rogue base station is suspected, the software according to the invention gives an alert for example by playing an alert sound, vibrating, flashing lights or displaying alert on screen of the mobile terminal.

After the detection of the rogue base station the mobile terminal can send an alert via SMS message (Short Message Service) or other communication means to an in advance defined information system. The information system can advantageously send back a map of the surroundings to the mobile station. The mobile terminal can then show on its display its current position and an estimated location of the detected rogue base station.

Location measurements of the mobile terminal in the serving cellular network can be based also on triangular measurements known in the art. In GSM networks timing advances of base stations can be utilized in the triangular measurement. The triangular measurement can therefore replace use of a GPS unit when finding a location of the mobile terminal.

Figure 2B:
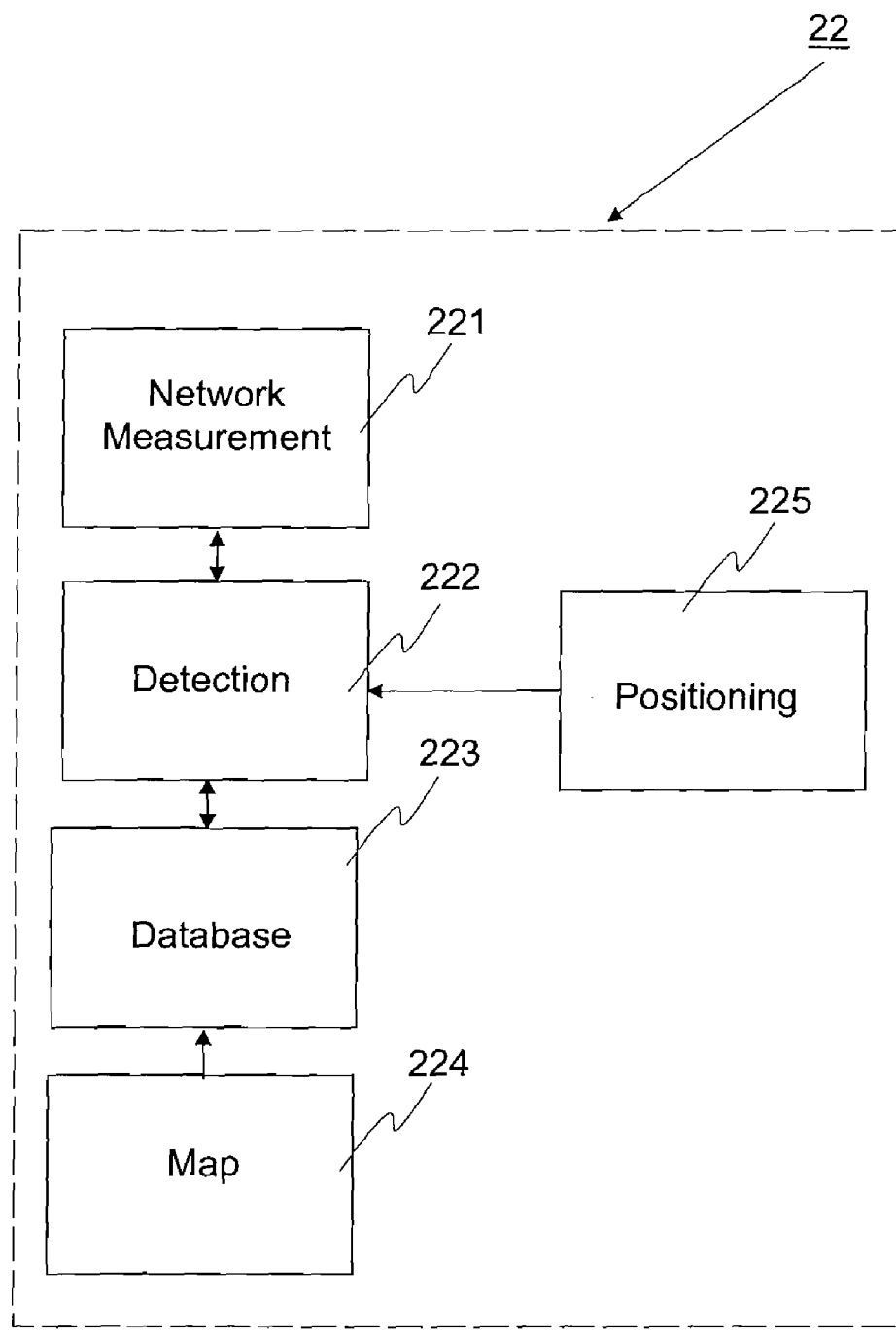
FIG. 2b shows as an example main functional blocks of software implementation of the man-in-the-middle detector according to the invention.

FIG. 2b illustrates as an example main functional blocks of measurement software 22 according to the invention. A network measurement block 221 of the software is utilized for receiving signaling transmissions from the serving base station and base stations in the neighborhood. The received transmissions can comprise for example BCCH transmissions, paging messages or location update rejection messages.

An optional positioning block 225 of the software uses GPS receiver data or equivalent satellite positioning receiver data to find out current location of the mobile terminal. The location can be alternatively be calculated by using triangular measurements in the serving cellular network.

A database block 223 of the software contains a database whereto reference base station parameters can be stored beforehand. For example LAC codes of cells, cell identifiers, C2 values and cause codes used in location update rejection messages and the same received from the actual base stations can be stored thereto. Also current position of the measurement apparatus can be stored to database.

A map block 224 of the software is utilized for displaying reference base station parameters and actual measurement results on a map display.

The detection block 222 implements detection of the rogue base station. In the first detection step all cells heard by the measurement apparatus are scanned through. During the scanning also parameters used by a rogue base station are recorded. During the scanning the measurement terminal may do a location update on cells to find out parameters exchanged during location update procedure. In the next detection step possible anomalies in the recorded parameters or in other messages concerning mobility are detected by comparing parameters and messages recorded from a rogue base station to parameters recorded from other authentic base stations. The possible anomalies to be searched can be for example LAC code of one cell differing substantially from the LAC code of other cells, high transmission power, unknown cell id, different periodic location update frequency, wrong network time, different cause code in location update termination, different C1 or C2 value, incorrect paging message, paging message with IMSI or some combination of the previous.

In one advantageous embodiment of the invention the detection block 222 uses results of the positioning block 225 to find out its current location. After that it can retrieve location-dependent network parameters from the database block 223 and compare actual measurement data from the network measurement block 221 against the retrieved reference data. In a case where a change of the network parameters can be found out the detection block 222 advantageously generates an alert.

An optional map block 224 of the software can retrieve and display on a map the current location of the mobile terminal. It can connect reference network information to the measured location. The map block 224 can also retrieve BCCH measurement results from the database 223 and visualize those results on the map.

Figure 3A:
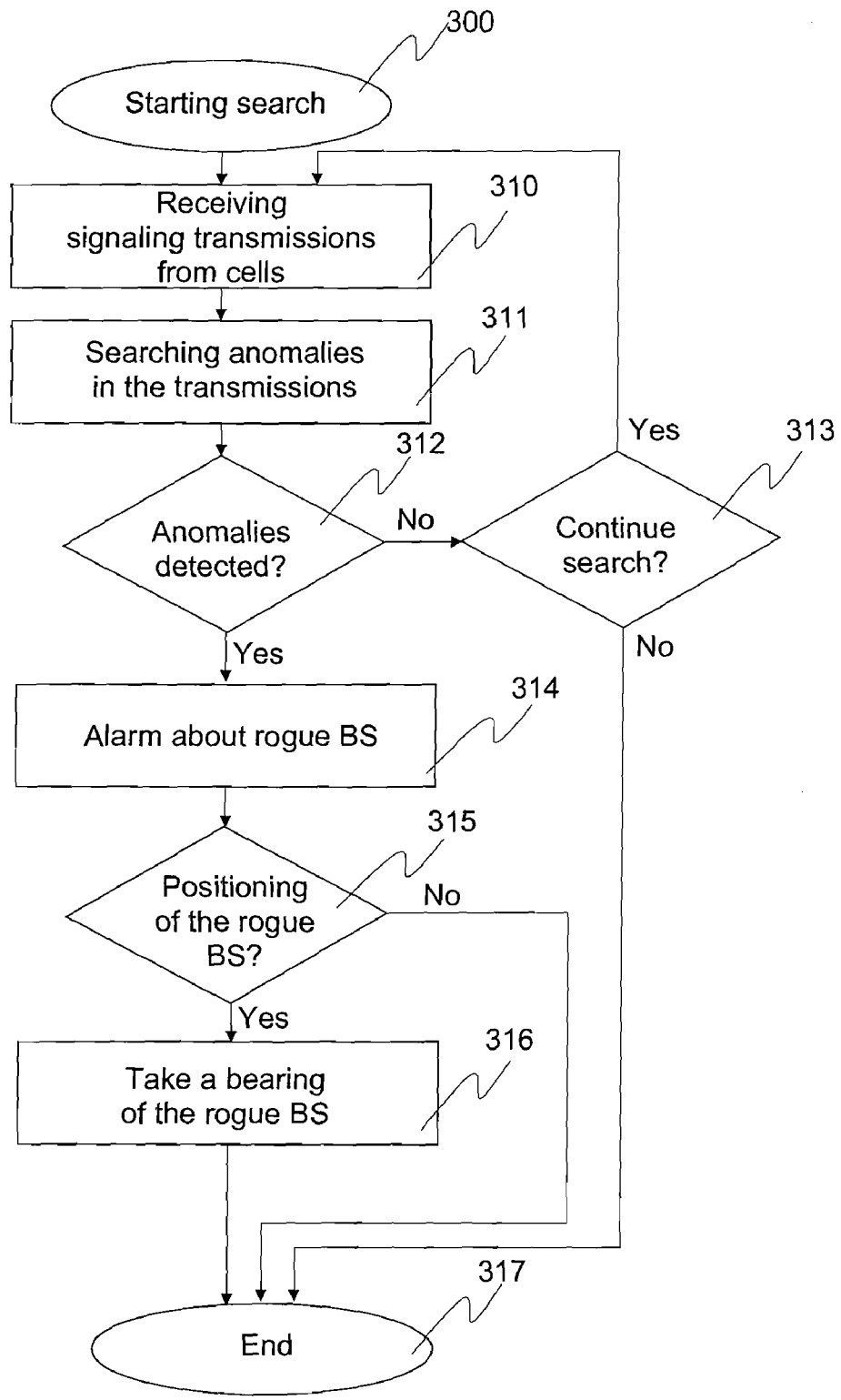
FIG. 3a shows as an exemplary a flow chart an advantageous embodiment of the method according to the invention.
Figure 3B:
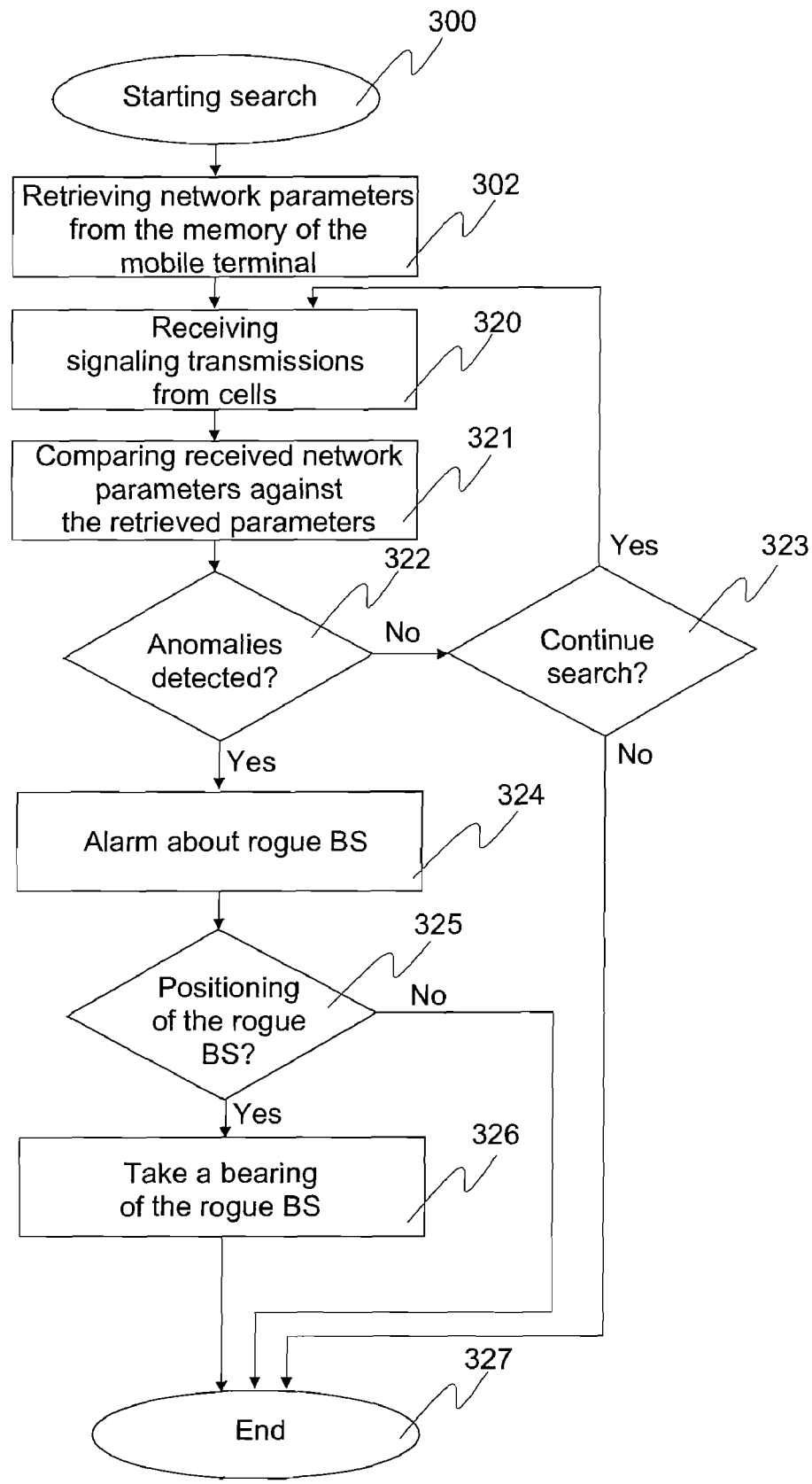
FIG. 3b shows as an exemplary a flow chart a second advantageous embodiment of the method according to the invention.
Figure 3C:
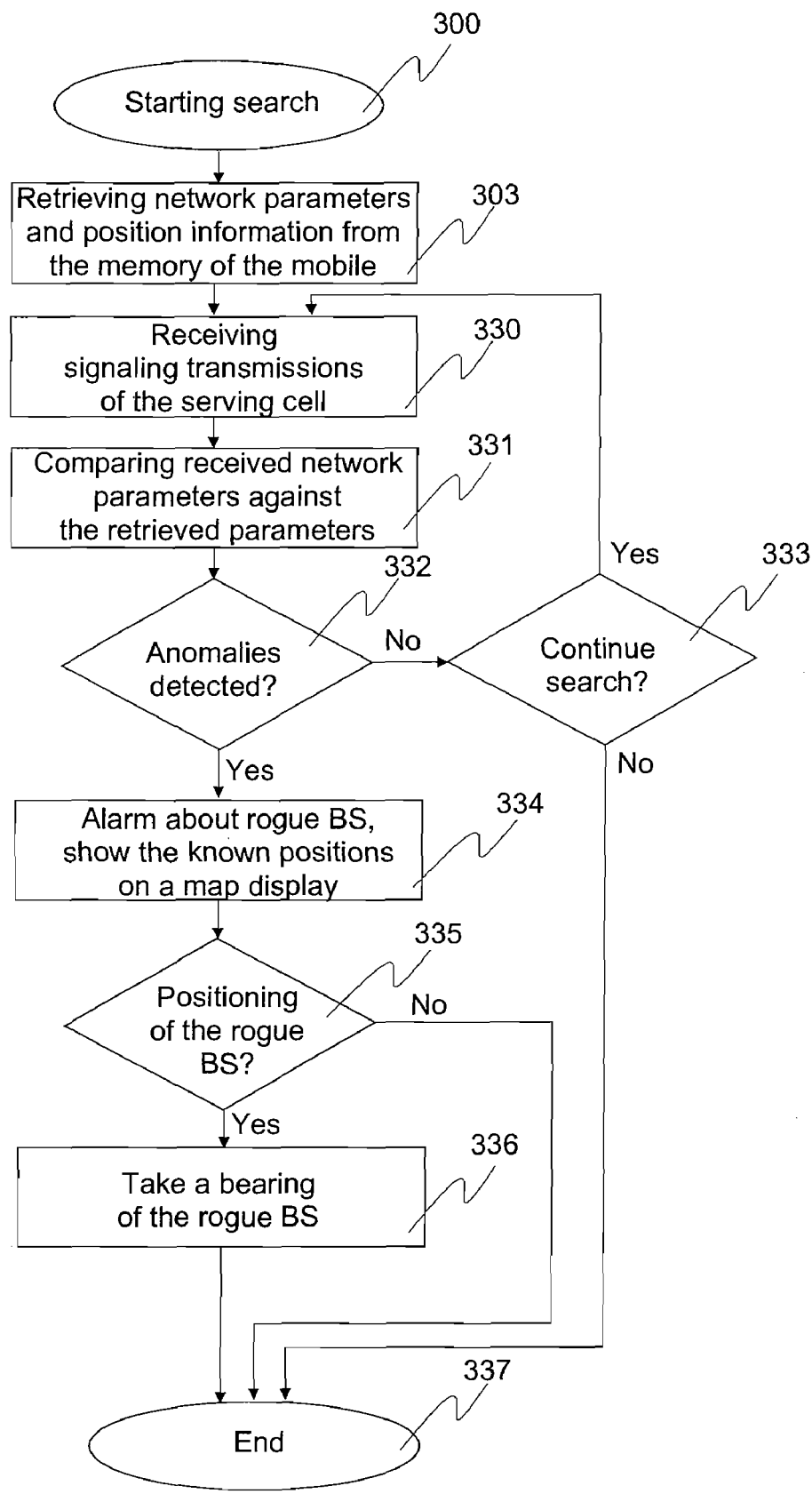
FIG. 3c shows as an exemplary a flow chart a third advantageous embodiment of the method according to the invention.

FIGS. 3a, 3b and 3c depict main steps of advantageous embodiments of the detection method according to the invention.

FIG. 3a depicts an example where signaling transmission of the serving and neighbor cells are utilized. The transmission can comprise for example BCCH messages, paging messages and location update rejection messages. The received messages can be used either each alone or as a combination to detect a rogue base station. There may not be a need to save the network parameters in advance. In step 300 the measurement apparatus or a mobile terminal capable of detecting a rogue base station starts a measurement according to the invention.

In step 310 the measurement apparatus receives signaling transmissions of the serving cell and all neighbor cells. During the step the measurement apparatus can do a location update on a cell to find out parameters exchanged during location update procedure. The measurement apparatus can interpret the received signaling messages.

In step 311 the detection block of the software searches for anomalies between transmissions of different cells. Searched anomalies can be for example a LAC code substantially different from the LAC code of other cells, high transmission power, unknown cell id, different periodic location update frequency, wrong network time, different cause code in location update termination, different C1 or C2 value, incorrect paging message, paging message with IMSI or a combination of the previous.

In step 312 it is decided if an anomaly is detected or not. If anomalies are not found, then in step 313 it is decided whether the search for anomalies should continue or not. If it is decided that the search will continue, the process returns to step 310 where new transmission from the cells is received. If it is decided that the search for rogue base stations does not need to continue, the process ends in step 317. At that stage the detection software according to the invention sets in a non-active state.

If in step 312 one or more anomalies are found then in step 314 the detection software raises an alert about a rogue base station. The alert can be for example giving an alert sound, vibrating, flashing lights or displaying alert on a screen of the mobile terminal or measurement apparatus.

In step 315 it is decided if there is a need to locate precisely where the rogue base station is. If the precise location is not needed the detection process ends in step 317.

If in step 315 it is decided to locate the rogue base station, then in step 316 the detection apparatus or mobile terminal takes a bearing to the rogue base station. That can be accomplished by using a directional antenna which can be connected to the mobile terminal. After finding the transmission direction, by using for example a timing advance used by the rogue base station an estimate of a distance to the rogue base station can be calculated. Another method for estimating the distance is to use transmission power of the rogue base station.

After the location operation the process ends in step 317 where the mobile terminal advantageously continues camping in the rogue base station in order not to give any hint that the rogue base station has been detected. Alternatively, the mobile station makes a new reselection in an actual base station of the cellular network.

FIG. 3b depicts another advantageous example where actually received signaling transmission, for example BCCH messages of base stations and known network parameters, are utilized to detect a rogue base station. The actual network parameters have been saved in advance into the memory of the mobile terminal or measurement apparatus.

In step 300 the measurement apparatus or a mobile terminal capable of detecting a rogue base station starts a measurement according to the invention.

In step 302 network parameters saved in advance are retrieved from the memory of the mobile terminal or measurement apparatus.

After that in step 320 the measurement apparatus receives signaling transmissions from the cells, for example BCCH broadcasts of the serving cell and all neighbor cells. During the step the measurement apparatus can do a location update on the cell to find out parameters exchanged during location update procedure. The measurement apparatus can interpret the received signaling messages.

In step 321 the detection block of the software searches anomalies for example between BCCH broadcast of different cells and network parameters saved in advance. Searched anomalies can be for example a LAC code substantially different from the LAC code than beforehand defined, higher transmission power than defined for other cells, unknown cell id, different periodic location update frequency, different cause code in location update termination, wrong network time, different C1 or C2 value, incorrect paging message, paging message with IMSI or a combination of the previous.

In step 322 it is decided if an anomaly has been detected or not. If no anomalies are found then in step 323 it is decided whether the search of a rogue base station should continue or not. If it is decided that the search will continue the process returns to step 320 where new BCCH broadcasts are received. If it is decided that the search for rogue base stations does not need to continue, the process ends in step 327. At that stage the detection software according to the invention is set in a non-active state.

If in step 322 one or more anomalies are detected then in step 324 the detection software raises an alert about a rogue base station. The alert can be for example giving an alert sound, vibrating, flashing lights or displaying alert on a screen of the mobile terminal or measurement apparatus.

In step 325 is decided if there is a need to locate precisely where the rogue base station is. If the precise location is not needed the detection process ends in step 327.

If in step 325 it is decided to locate the rogue base station, then in step 326 the detection apparatus or mobile terminal takes a bearing to the rogue base station. That can be accomplished by using a directional antenna which can be connected to the mobile terminal. After finding the transmission direction, by using for example a timing advance used by the rogue base station an estimate of a distance to the rogue base station can be calculated. Another method for estimating the distance is to use transmission power of the rogue base station.

After the location operation the process ends in step 327 where the mobile terminal advantageously continues camping in the rogue base station in order not to give any hint that the rogue base station has been detected. Alternatively, the mobile station makes a new reselection in an actual base station of the cellular network.

FIG. 3c depicts a third advantageous example where signaling transmissions received from the serving base station, for example BCCH messages, network parameters saved in advance and position information of the base stations, are utilized to detect a rogue base station. The network parameters and position information of the base stations belonging to the network have been saved in advance into the memory of the mobile terminal or measurement apparatus.

In step 300 the measurement apparatus or a mobile terminal capable of detecting a rogue base station starts a measurement according to the invention.

In step 303 network parameters saved in advance and position information are retrieved from the memory of the mobile terminal or measurement apparatus.

After that, in step 330 the measurement apparatus receives for example BCCH broadcasts of the serving cell and all neighbor cells. During the step the measurement phone can do a location update on a cell to find out parameters exchanged during location update procedure. The measurement apparatus can interpret the received signaling messages.

In step 331 the detection block of the software searches anomalies between BCCH broadcasts of the cells; network parameters saved in advance and position information. Searched anomalies can be for example a LAC code substantially different from the LAC code than defined in advance, higher transmission power than the defined, unknown cell id, different periodic location update frequency, different cause code in location update termination, wrong network time, different C1 or C2 value, incorrect paging message, paging message with IMSI or a combination of the previous.

By using its own GPS location measurement the mobile terminal can decide by using transmission power or timing advance of the serving cell and its own location information if the serving cell is located in a predetermined geographical place, i.e. if it is one of the cells defined in advance.

In step 332 it is decided if an anomaly has been detected or not. If anomalies are not found then in step 333 it is decided whether the search for rogue base station should continue or not. If it is decided for some reason that the search will continue, the process returns to step 330 where new BCCH broadcast is received. If it is decided that the search for rogue base stations does not need to continue, the process ends in step 337. At that stage the detection software according to the invention is set in a non-active state.

In step 332 it is decided if an anomaly has been detected or not. If in step 332 an anomaly is detected then in step 334 the detection software raises an alert about a rogue base station. The alert can be for example giving an alert sound, vibrating, flashing lights or displaying alert on a screen of the mobile terminal or measurement apparatus. After that a map can be displayed where locations of the mobile terminal and actual base stations are positioned.

In step 335 it is decided if there is a need to locate more precisely the rogue base station. If the precise location is not needed the detection process ends in step 337.

If in step 335 it is decided to locate precisely the rogue base station then in step 336 the detection apparatus or mobile terminal takes a bearing to the rogue base station. That can be accomplished by using a directional antenna which can be connected to the mobile terminal. After finding the transmission direction, by using for example a timing advance used by the rogue base station an estimate of a distance to the rogue base station can be calculated. Another method for estimating the distance is to use transmission power of the rogue base station. After that an estimated place of the rogue base station can be displayed on a map display.

After the location operation the process ends in step 337 where the mobile terminal advantageously continues camping in the rogue base station in order not to give any hint that the rogue base station has been detected. Alternatively, the mobile station makes a new reselection in an actual base station of the cellular network.

The functional blocks of detection software depicted in FIG. 2a and method steps depicted in FIGS. 3a-3c can be implemented by utilizing a proper programming language known in the art. The detection software is advantageously saved in a memory of the mobile terminal, measurement apparatus or personal computer. Instructions comprised in the detection software are advantageously executed in a proper processor included in a mobile terminal or measurement apparatus. Detection results can be displayed using a display unit included in the mobile terminal or measurement apparatus.

Some advantageous embodiments according to the invention were described above. However, the invention is not limited to the advantageous GSM embodiments described. Various embodiments of the invention can be used in a number of different cellular systems. The inventive idea can be applied in numerous ways within the scope defined by the claims attached hereto.

The invention claimed is:

1. A method comprising:
a mobile terminal of a cellular telephone network receiving signaling messages at least from a first base station and a second base station of the cellular telephone network;
the mobile terminal interpreting both last received signaling messages;
the mobile terminal searching for an anomaly by comparing at least one signaling parameter included in the message received from the first base station to the same signaling parameter included in the message received from the second base station; and
the mobile terminal giving an alert about a rogue base station when the comparison gives an anomaly concerning at least one signaling parameter of the message of the first base station or the second base station.

2. The method according to claim 1, wherein the signaling parameter utilized in the comparison is included in a signaling message.

3. The method according to claim 1, wherein a signaling parameter utilized in the comparison is included in a broadcast control channel message.

4. The method according to claim 1, wherein a signaling parameter utilized in the comparison is included in a paging message.

5. The method according to claim 1, wherein a signaling parameter utilized in the comparison is included in a location update rejection message.

6. The method according to claim 1, wherein a parameter utilized in the comparison is one of the following: a location area code, C1 value, C2 value, network time, transmission power, periodic location update frequency, cause code in location update termination and international mobile subscriber identity.

7. The method according to claim 1, wherein after a given alert a bearing is taken to the rogue base station for locating its geographical position.

8. The method according to claim 1, wherein the cellular network is a GSM network.

9. A mobile terminal of a cellular telephone network comprising:
a receiver configured to receive signaling messages at least from a first base station and a second base station of the cellular telephone network;
a processor configured to interpret both last received signaling messages;
a memory configured to save interpreted signaling parameters;
wherein the processor is configured to execute steps of a software program comprising computer readable code for searching for an anomaly in a received signaling message by comparing at least one signaling parameter of the message received from the first base station to a signaling parameter of the message received from the second base station; and
an alarm unit configured to give an alert about a rogue base station when the comparison gives an anomaly concerning at least one signaling parameter of the message of the first base station or the second base station.

10. A non-transitory computer readable medium storing a set of instructions for execution by one or more processors to detect a rogue base station, the set of instructions comprising the steps of claim 1 or claim 6.

11. The mobile terminal according to claim 9, wherein the software program for searching an anomaly comprises computer readable code to interpret a signaling parameter included in a broadcast control channel message of the first base station against a signaling parameter included in a broadcast control channel message of the second base station.

12. The mobile terminal according to claim 9, wherein the software program for searching an anomaly comprises computer readable code to interpret a signaling parameter included in a paging message of the first base station against a signaling parameter included in a broadcast control channel message of the second base station.

13. The mobile terminal according to claim 9, wherein the software program for searching an anomaly comprises computer readable code to interpret a signaling parameter included in a location update rejection message of the first base station against a signaling parameter included in a broadcast control channel message of the second base station.

14. The mobile terminal according to claim 9, wherein a signaling parameter utilized in the comparison is one of the following: a location area code, C1 value, C2 value, network time, transmission power, periodic location update frequency, cause code in location update termination and international mobile subscriber identity.

15. The mobile terminal according to claim 9, wherein the mobile terminal further comprises a locating receiver for making location measurements the results of which are configured to be utilized as a further comparison parameter in the anomaly search.

16. The mobile terminal according to claim 15, wherein the mobile terminal further comprises a means for retrieving and showing a location of the mobile the mobile terminal and base stations of the serving cellular network on a map display.

17. The mobile according to claim 9, wherein the mobile terminal is further configured to take a bearing towards a detected rogue base station.

18. The mobile terminal according to claim 17, wherein the mobile terminal is further configured to estimate a distance to the detected rogue base station either by utilizing a timing advance or transmission power of the rogue base station.

19. The mobile terminal according to claim 18, wherein the mobile the mobile terminal is a mobile terminal of a GSM network.

* * * * *